Aug. 28, 1945.  W. A. WURTH  2,383,636

TEMPERATURE CONTROL OF CATALYTIC REACTIONS

Filed Aug. 9, 1941  2 Sheets-Sheet 1

Walter A. Wurth Inventor
By Ph. Young Attorney

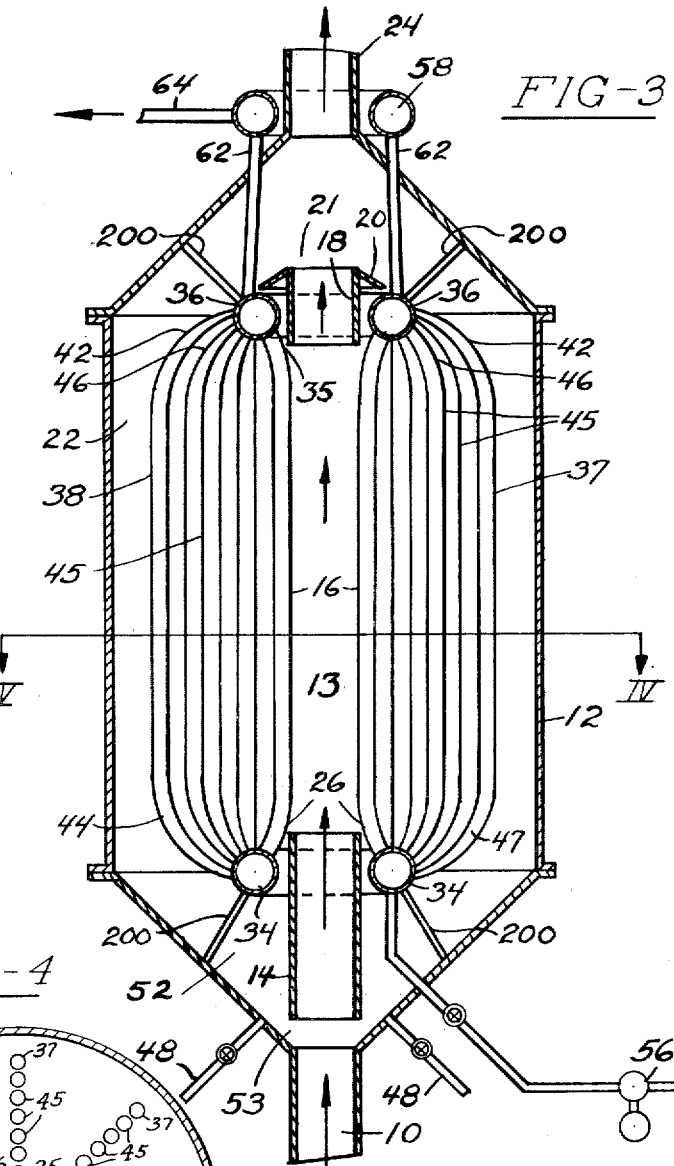
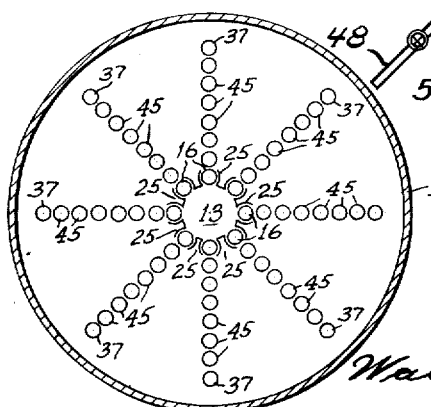

Patented Aug. 28, 1945

2,383,636

UNITED STATES PATENT OFFICE 2,383,636

TEMPERATURE CONTROL OF CATALYTIC REACTIONS

Walter A. Wurth, Cranford, N. J., assignor to Standard Oil Development Company, a corporation of Delaware Application August 9, 1941, Serial No. 406,226

9 Claims. (Cl. 23—1)

This invention relates to controlling the temperature in chemical reactions and more particularly relates to controlling the temperature of exothermic reactions involving powdered catalyst where a suspension of powdered catalyst in finely divided form is passed upwardly with a reactant or reactants through a reaction zone or chamber.

In exothermic reactions involving the use of catalyst it is important to remove the heat from the catalyst to prevent overheating of the catalyst and reactants. In certain catalytic reactions overheating of the catalyst partially or totally deactivates the catalyst depending on the amount of overheating. If the temperatures are too high, the yields of desired products are decreased due to side reactions.

Heretofore, heat exchangers were used which were separate from and outside the reaction zones. According to my invention the heat exchange equipment is entirely arranged in the same shell or vessel which houses the reaction zone. In this way the piping requirements are simplified and less costly. Expansion joints are eliminated. Also less pressure drop is involved in circulating the material to be cooled by my arrangement of heat exchange equipment.

According to my invention, exothermic catalytic reactions are carried out under controlled conditions so that the catalyst is not overheated and the reactants are maintained at the desired temperature during the reaction. For example, in reactions involving the reduction of hydrocarbons where reacting carbon monoxide and hydrogen in the presence of catalyst, the reactants are mixed with powdered or finely divided catalyst particles to form a suspension which is passed upward through an enlarged reaction chamber. In such reaction chambers there is an evolution of heat due to the reaction and it is desirable to remove the heat to maintain the reaction at the desired temperature.

In a reaction chamber constructed to embody my invention I provide means for removing heat from the reaction chamber by means of tubes, certain of the tubes being so arranged to contact the catalyst particles and reactants or suspending gases or vapors as they pass upward through the reaction chamber. The tubes form part of a boiler, such as a steam boiler or the like, the tubes being vertically arranged and being in communication with steam and water drums. It is advantageous to have the boiler tubes vertically arranged because this arrangement permits downward flow of the catalyst particles without undue obstructions.

The suspension of catalyst particles in reactant gas or gases is introduced into the bottom portion of the reaction zone or chamber and passes upward through a central vertical passageway which is formed by arranging a circle of vertical tubes. If desired, the tubes may be provided with fins, or metal or other inserts may be placed between the tubes to form the reaction chamber. Or, the tubes alone may be used. The tubes form a smooth passageway for the suspension and it will be seen that the suspension including the catalyst particles is in direct contact with the tubes forming part of the boiler. As the suspension passes upwardly the catalyst particles are in intimate contact with the vapors or gases and the mixture is in a turbulent condition. In this way heat is absorbed by the fluid in the inner circle of tubes and the temperature of the catalyst particles is prevented from rising too high. The reaction zone formed by the inner circle of tubes is arranged entirely within a shell or container. The lower ends of the central tubes communicate with a water drum in the shell or container and the upper ends of the central tubes communicate with a steam drum in the shell or container. As the suspension leaves the top of the reaction chamber, it passes into a larger volume and the velocity of the gases or vapors is decreased due to the enlarged volume. Due to the decrease in velocity the catalyst particles are dropped out of the suspension and fall down over additional vertically arranged tubes communicating with the water and steam drums above described. By varying the velocity of the gases or vapors, the amount of catalyst removed from the suspension may be varied.

Certain of the last-mentioned set of tubes form a larger outer circle concentric with the first circle of tubes but arranged closer to the wall of the reaction zone or chamber. Other tubes are vertically arranged in the space between the concentric circles of tubes. At the upper and lower portions the tubes of the larger circle are bent inwardly toward the steam drum and water drum, respectively to provide slightly inclined tube portions with which the falling catalyst particles are contacted and heat exchange is effected between the fluid in the tubes and the catalyst particles. The other vertical tubes between the inner and outer circles of tubes have bent portions for connecting with the respective drums.

My invention may be used where exothermic catalytic reactions are involved such as polymerization, hydrogenation, the reduction of carbon monoxide by hydrogen and other chemical reaction or where endothermic catalytic reactions are used such as cracking, reforming, dehydrogenating, etc. In endothermic reactions heat is supplied to the reaction by means of the drums and tubes above described. My invention may also be used to regenerate catalyst particles which have been used in the catalytic conversion of hydrocarbons. In cracking, dehydrogenation, polymerization, alkylation, etc., carbonaceous or organic material is deposited on the catalyst particles and if these catalyst particles are to be reused they are preferably regenerated. Preferably the carbonaceous material is removed by burning with air or other oxidizing agent. As the regeneration operation is an exothermic one, it is necessary to carefully control the temperature during regeneration and my invention is especially adapted for such control.

In my invention desired amounts of the separated catalyst particles are recycled to the reaction zone or chamber and the rest of the catalyst particles together with the gaseous or vaporous products of the reaction pass overhead and the catalyst particles are separated from the vaporous or gaseous products of reaction in any suitable manner.

In the drawings:

Fig. 3 is an enlarged vertical cross section taken through a reaction zone or chamber embodying my invention; and Fig. 4 represents a horizontal transverse cross section taken on line IV—IV on Fig. 3.

Figure 1:
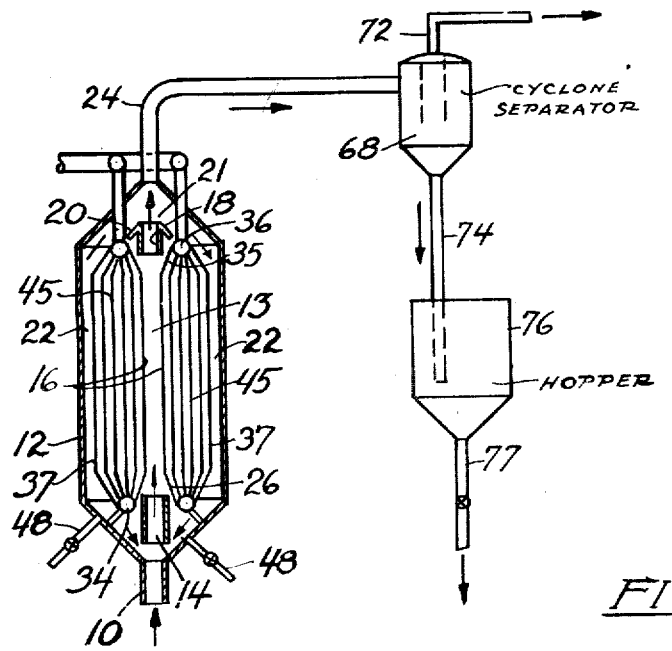
Fig. 1 represents one form of apparatus for carrying out an exothermic catalytic reaction or for regenerating fouled catalyst particles.

Referring now to the drawings and to Figs. 1, 3 and 4, the reference character 10 designates a line for conducting a suspension of solid catalyst particles in gaseous or vaporous reactants. The suspension is introduced into the bottom portion of a vessel or shell 12 having a reaction zone 13. Where an exothermic catalytic reaction is involved, it is often necessary to prevent overheating of the reactants and overheating of the catalyst particles, this may be accomplished by removing some of the heat of reaction from the reaction zone or chamber during the reaction. The reaction zone or chamber 12 is shown in greater detail in Figs. 3 and 4 and attention is directed to these figures in connection with the following description.

The suspension as it enters the vessel 12 passes upwardly through the central vertical passageway 13 which forms the reaction zone. The reaction zone 13 is formed by sleeve 14, vertically arranged tubes 16 and a top sleeve 18 provided with an inclined top flange 20. The suspension of catalyst particles in the gaseous fluid passes upwardly through this passageway or zone. During its upward passage the velocity of the gases or vapors is so adjusted that the catalyst particles are fluidized, that is the mixture of catalyst particles and gas or vapors take on the appearance of a liquid. In fluidized form the mixture is in turbulent condition and there is intimate contact between the catalyst particles and gas or vapors and the heat exchange tubes 16. As the fluidized mixture leaves the upper sleeve 18 there is a decrease in the velocity of the suspension due to the enlarged volume 21 at the top of the reaction chamber. Due to this decrease in velocity some of the catalyst particles are separated and dropped from the suspension and fall through the annular chamber 22 arranged between reaction zone 13 and shell 12 as will be presently described. The rest of the catalyst particles and the products of reaction pass upwardly and leave the top of the vessel 12 through outlet line 24 and are further treated as will be further described hereafter in greater detail.

The vertical central passageway or reaction zone 13 is formed by the vertical tubes 16 arranged in parallel relation and substantially in a circle. In order to provide a smooth passageway, inserts 26 may be provided between the tubes. However, the inserts may be omitted, if desired. The tubes 16 may be provided with fins to provide a central passageway or reaction chamber 13. The lower ends of the tubes 16 are bent outwardly away from reaction zone 13 as at 28 and communicate with an annular liquid drum 34 arranged in the lower portion of the shell 12. It will be noted that the sleeve 14 is provided as a conduit for carrying the catalyst-vapor mixture upwardly beyond the bent portions 28 of the tubes 16 so that the suspension will continue upwardly through the reaction zone or central passageway 13. The upper ends of the central tubes 16 are bent outwardly away from zone 13 as at 36 and communicate with an annular drum 36 arranged in the upper portion of the shell 12. The lower part of flanged sleeve 18 is arranged to extend below the bent portions 35 of the tubes to form a continuation of the passageway 13 formed by the tubes 16 to carry the suspension upward beyond the drum 36.

A larger concentric circle of tubes 37 is provided in annular chamber 22 which communicates with the drums 34 and 36 and which is arranged closer to the wall of the shell or vessel 12. Each tube forming the outer circle has a vertical portion 38, an inclined upper portion 42 and a lower inclined portion 44. The upper portions 42 communicate with the drum 36 and the lower portions 44 communicate with the drum 34. Where water is used as the heat exchange medium, drum 36 is a steam drum and lower drum 34 is a water drum.

Arranged between tubes 16 and 37 are intermediate tubes 45 which have inclined upper portions 46 leading to drum 36 and inclined lower portions 47 leading to drum 34. See the cross section in Figure 4 for the arrangement of the intermediate tubes 45. As the separated catalyst particles fall, they contact the heat exchange tubes and are cooled. Fluidizing gas is preferably introduced into the bottom portion of shell 12 at a plurality of points as 48 to maintain the separated catalyst particles in annular chamber 22 in a fluidized condition whereby the catalyst particles are in a turbulent condition and well mixed and a substantially uniform temperature is maintained throughout the mass. By maintaining a fluidized condition of the catalyst particles good heat exchange between the catalyst and tubes is obtained.

It will be seen from the drawings and from an inspection of Figure 3 that the flange 20 on the top sleeve 18 extends over the steam drum 36 so that the separated catalyst particles are returned to the annular chamber 22. The catalyst particles which are dropped from the suspension pass downwardly and contact the top bent portions 42 of the outer tubes 37 and the top bent portions 46 of certain of the intermediate tubes 45. The process is preferably so carried out that the annular chamber 22 is substantially completely filled with fluidized catalyst. When smaller amounts or levels of fluidized catalyst are maintained in chamber 22, baffles may be used to direct the falling catalyst particles as desired.

The cooled fluidized catalyst particles after having passed in heat exchange relation with the tubes 37 and 45 move downward into the space 52 in the lower portion of the shell or vessel 12 and then pass through annular opening 53 between sleeve 14 and shell 12 where they are picked up by the incoming catalyst and feed mixture and again passed upwardly through the vertical central passageway forming reaction chamber 13.

An inlet line 54 for liquids is provided having a pump 56 for introducing liquid into the lower drum 34. The upper drum 36 communicates with another drum 58 situated outside of the shell 12 through lines 62. Dry steam is withdrawn from drum 58 by means of line 64.

The products of reaction in vapor or gas form and catalyst particles passing through line 24 (see Figure 1) are introduced into a suitable separating system such as a cyclone separator 68 for separating solids from vapors and gases. While only one cyclone separator is shown, it is to be understood that a plurality of cyclone separators is preferably used and in addition a Cottrell precipitator or filter means may be used for removing the catalyst fines from the gases and vapors leaving the cyclone separators. The separated gases and vapors pass overhead through line 72 and are further treated as desired to separate valuable constituents therefrom. The solid catalyst particles are collected in the bottom of the separating means 68 and are passed through line 74 to a hopper 76 from which they are withdrawn through line 77. In the catalytic reactions which are carried out according to my invention the catalyst particles become inactivated or fouled after being used for a certain time and the catalyst particles are regenerated in any suitable manner.

In a process as above described the reaction zone 13 and vessel 12 may be used for reactions involving the reduction of carbon monoxide by hydrogen, for example, in the presence of suitable catalyst. In this reaction the catalyst is not fouled rapidly and may be recirculated in the reaction zone 13 a number of times before it need be regenerated. The catalyst particles are preferably of a size of about 100 to 400 standard mesh.

Figure 2:
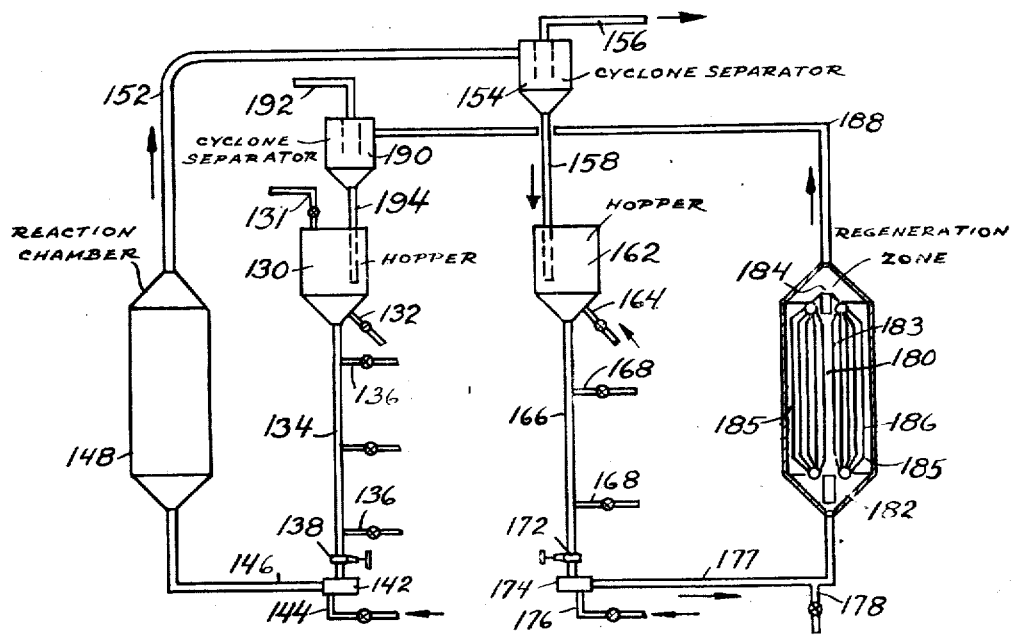
Fig. 2 represents apparatus adapted to carry out catalytic conversions of hydrocarbons and includes a regeneration zone or chamber.

In Figure 2 of the drawings I have shown apparatus adapted for catalytic conversions of hydrocarbons such as cracking, dehydrogenation, alkylation, isomerization, etc. The catalytic cracking of higher boiling hydrocarbons to form lower boiling hydrocarbons will be specifically described. A hopper 130 is provided into which fresh catalyst particles are introduced through line 131. For catalytic cracking of hydrocarbons any suitable catalyst may be used such as acid treated bentonites, synthetic clays, synthetic gels containing silica and alumina or silica and magnesia, etc. The catalyst is preferably in finely divided form having a size of about 100 and 400 standard mesh. The catalyst particles in the bottom of the hopper 130 are fluidized or rendered mobile by the introduction of a suitable inert gas such as steam through line 132. The fluidized catalyst particles flow into an elongated standpipe 134 which is preferably provided with lines 136 for introducing a fluidizing medium into the standpipe to maintain the catalyst particles in a fluid condition. The bottom of the standpipe 134 is provided with a valve 138 which may be manually or automatically operated to control the amount of catalyst particles fed from the standpipe.

The fluidized catalyst particles in the standpipe act as a liquid and provide a head of pressure for forcing the catalyst particles and reactants through the system. For example, with a standpipe of about 120 feet a pressure of about 20 pounds per square inch is obtained at the bottom of the standpipe with fluidized clay particles.

The catalyst particles from the standpipe are fed into a mixing zone 142 where they are mixed with hydrocarbon vapors and gases introduced through line 144. The mixture of catalyst particles and hydrocarbon vapors and gases are passed through line 146 and into the lower portion of an enlarged vertically arranged reaction chamber 148. As the cracking of hydrocarbons is an endothermic reaction, it is not necessary to provide a cooling means in the reaction chamber 148. If desired, tubes may be arranged within the reaction chamber 148 similar to that shown in vessel 12 for supplying heat to the reactants and catalyst in the reaction chamber 148.

Due to the enlarged diameter of the reaction chamber 148, the velocity of the catalyst feed mixture is reduced as it enters the reaction chamber and due to the reduction in velocity there is some slippage between the catalyst particles and the gases and vapors passing through the reaction chamber 148. By this decrease in velocity, there is an increase in the concentration of the catalyst particles in the hydrocarbon vapors and gases over that in the inlet pipe 146. The suspension in passing through the reaction chamber 148 is in a turbulent condition and good mixing and good contact is obtained between the catalyst particles and the hydrocarbon vapors and gases.

The products of reaction and catalyst particles leave the top of the reaction chamber 148 through line 152 and are passed to a separating system 154 which is shown as a cyclone separator. Preferably more than one cyclone separator is used. The separated products of reaction in vapor form pass overhead through line 156 and are passed to suitable equipment such as fractionating means for separating desired constituents from higher boiling hydrocarbons.

The catalyst particles during the cracking of the hydrocarbons become coated with carbonaceous or organic material which reduces the activity of the catalyst particles. Before reusing the catalyst particles, it is preferable to regenerate them. However, in some instances a portion of the unregenerated catalyst may be recycled to the reaction chamber 148. The catalyst particles coated with carbonaceous material fall to the bottom of the separator 154 and are withdrawn therefrom through line 158. From line 158, the particles are introduced into a hopper 162 with the pipe 158 extending below the level of catalyst particles in the hopper 162.

The catalyst particles in the hopper 162 are preferably fluidized by the introduction of steam or other suitable gas through line 164. Sufficient amounts of fluidizing gas are introduced to fluidize the catalyst particles as above described in connection with the other hoppers. The fluidized catalyst particles flow into a standpipe 166 which is also provided with lines 168 for the addition of further amounts of fluidizing gas to maintain the catalyst particles in fluid condition in the standpipe. The lower end of the standpipe 166 is provided with a valve 172 which may be manual or automatically operated to control the amount of catalyst particles leaving the outlet of the standpipe 166.

The catalyst particles from the standpipe 166 are fed into a mixing zone 174 where they are mixed with an additional amount of steam introduced through line 176 to form a suspension of the fouled catalyst particles. The suspension is passed through line 177 and air is introduced through line 178 to supply an oxidizing agent for the carbonaceous material on the catalyst particles. The suspension is then passed into the lower portion of a regeneration zone or chamber 182 (diagrammatically shown) which is of substantially the same construction as the reaction zone 13 and vessel 12 described in connection with Figures 1, 3 and 4.

The regeneration of catalyst particles separated from cracked products is an exothermic reaction and during regeneration it is necessary to control the temperature and to prevent the temperature from rising too high. For example, where acid activated clays are used as catalysts, it is necessary to maintain the top temperature below about 1100° F. With some catalysts higher temperatures may be used. However, it is necessary to control the temperature during regeneration and the boiler construction described in connection with reaction chamber 12 is especially adapted for controlling the temperature during regeneration in the regeneration zone 180 arranged in vessel 182. The regeneration zone 180 is formed by a circle of tubes 183 and due to the fluidized condition, the catalyst particles have intimate contact with tubes 183 and are cooled. As the fluidized catalyst passes upward into space 184, the velocity is reduced and the catalyst particles pass into annular chamber 185 where they contact other cooling tubes 186 similar to those above described in connection with vessel 12. The separated catalyst particles in annular chamber 185 are also fluidized and returned to regeneration zone 180 to assist in cooling during regeneration. The amount of regenerated catalyst recycled is controlled to obtain the desired temperature during regeneration. From the above it will be seen that the catalyst particles are regenerated and cooled in one apparatus.

The regenerated catalyst particles and combustion gases pass overhead through line 188 and are introduced into a separating system 190 which is shown on the drawings as a cyclone separator. Preferably more than one cyclone separator is used and in addition an electric precipitator may be used to remove the residual fine catalyst particles from the outgoing combustion gases. The combustion or regeneration gases pass overhead through line 192 and the regenerated catalyst particles are withdrawn from the bottom of the separator 190 by means of line 194 which preferably extends beneath the level of the catalyst particles in the hopper 130. The catalyst particles from hopper 130 are introduced into the standpipe 134 from which they are introduced into the reaction chamber 148 as above described.

A specific example for the reduction of carbon monoxide with hydrogen will now be given. A mixture of carbon monoxide and hydrogen in the proportion of about 1 mol of carbon monoxide to 2 mols of hydrogen is introduced into reaction zone 13 through line 10. The feed gas preferably contains about 95% of the reactants, the remainder being nitrogen or other inert gas and free of sulfur. The catalyst which is mixed with the gaseous feed is of the Fischer-Tropsch type containing about 30% by weight of cobalt and a metal oxide promoter, such as magnesia, deposited on kieselguhr. The catalyst has a particle size of about 100 to 400 mesh. The catalyst is preferably in aerated form. As an aerating gas, a small amount of hydrogen is used.

The temperature in the reaction zone 13 is maintained at about 370° F. The reduction of carbon monoxide is exothermic and the liquid in the tubes in the reaction zone 13 and vessel 12 acts to maintain the temperature in the reaction zone within the desired limits. Heat is absorbed by the liquid in the tubes and in this way the temperature of the catalyst particles is reduced. The mixture of catalyst particles and gases to be reacted enter the vessel 12 at a temperature of about 150° F., and should not be allowed to exceed about 300° F. before admission to the reaction chamber 13.

Another example involving the catalytic cracking of hydrocarbons will be now given. Hydrocarbon vapors such as gas oil vapors are introduced into mixing zone 142 where they are mixed with acid activated bentonite of a standard mesh between about 100 and 400. The ratio of catalyst to oil vapors is about 4 parts of catalyst to 1 part of oil vapors by weight. The mixture as it enters the reaction zone 148 is at a temperature of about 850° F. to 975° F. In the reaction zone 148 the catalyst particles and the oil vapors are thoroughly mixed and maintained in intimate contact to effect the desired extent of conversion. The residence time of the oil vapors in the reaction zone is about 15 seconds.

The reaction products and the catalyst particles pass overhead through line 152 and the vaporous reaction products are separated from catalyst particles in the separating means 154. The reaction products in vapor form pass overhead through line 156 to suitable fractionating equipment to recover desired lighter constituents from higher boiling constituents.

The separated catalyst particles being coated with carbonaceous deposits are preferably regenerated. The catalyst particles and air in admixture with steam are introduced into the lower portion of the regeneration zone 180 in vessel 182 for burning off the carbonaceous deposits and regenerating the catalyst particles. The regeneration is an exothermic reaction and when an acid activated clay such as bentonite is used as a catalyst it is necessary to control the temperature and maintain it below about 1100° F. to prevent sintering and deactivating of the catalyst particles. The boiler as described in connection with the reaction chamber 13 is the construction used in the regeneration zone 180 to control the temperature of the catalyst particles during regeneration.

The air and fouled catalyst particles pass upward through regeneration zone 180 as a fluidized mass. As the fluidized mass reaches enlarged space 184 there is a decrease in the velocity and catalyst particles are dropped into annular chamber 185 where they are fluidized by introduction of a suitable fluidizing gas such as steam. The regenerated catalyst particles are cooled by contacting the tubes 186 and due to the fluidized condition there is intimate contact between the catalyst particles and heat exchange tubes. The cooled regenerated catalyst particles are then recycled to the regeneration zone 180 and assist in controlling the temperature of additional fouled catalyst being regenerated in regeneration zone 180.

The regenerated catalyst particles which pass overhead through line 188 are separated in cyclone 190 and are then returned to the catalyst hopper 130 for reuse in another cracking operation.

The boiler tubes and drums are supported in the shell in any suitable manner as by supports 200. The sleeves 14 and 18 may be welded or otherwise attached to the tubes or drums in the shell.

While in Figure 4 I have shown rows of spaced tubes, it is to be understood that the tubes may be so arranged to fill in the spaces between tubes 45 and 37 to substantially completely fill the vessel 12 with vertically arranged heat exchange tubes.

While examples have been given involving the reduction of carbon monoxide with hydrogen and catalytic cracking of hydrocarbons and several reactions have been described as being capable of being carried out in a reaction zone including an internal boiler of construction, it is to be understood that these are by way of illustration only and changes and modifications may be made without departing from the spirit of my invention.

I claim:

1. A process for carrying out chemical reactions which comprises passing a fluidized mass of solid finely divided particles in a gaseous medium upwardly through a confined passageway formed by heat exchange tubes arranged and terminating within a vessel, passing the fluidized mass into a larger space after it leaves said passageway so that some of the particles drop out of the fluidized mass and are contacted with additional heat exchange tubes in said vessel to cool the solid particles, mixing the cooled particles with additional gaseous medium and solid particles and passing the last mentioned mixture as a fluidized mass through said passageway.

2. A process for carrying out chemical reactions which comprises passing a fluidized mass of solid finely divided particles in a gaseous medium through a confined passageway formed by heat exchange tubes arranged and terminating within a vessel, removing some of the catalyst particles from the fluidized mass after it leaves said passageway and passing the removed catalyst particles over additional heat exchange tubes, then mixing the particles with additional gaseous medium and catalyst particles to form a fluidized mass and passing the last mentioned fluidized mass through said passageway.

3. A process for carrying out exothermic reactions which comprises passing a mixture of finely divided catalyst particles in a gas as a fluidized mass upwardly through a confined passageway formed by heat exchange tubes containing a heat exchange medium and arranged and terminating within a vessel, the heat evolved during the reaction being absorbed by the medium in said heat exchange tubes, separating some of the finely divided catalyst particles by reducing the velocity of the fluidized mass as it leaves the top of the confined passageway, passing the separated hot catalyst particles over other fluid containing heat exchange tubes arranged in the space between said vessel and said passageway to remove additional heat from the catalyst particles and adding the separated cooled catalyst particles to additional amounts of gas and catalyst particles for passage through said confined passageway as a fluidized mass.

4. A method of controlling the reaction temperature in an exothermic reaction which comprises passing a fluidized mass of finely divided solid particles in a gaseous medium containing a reactant gas upwardly through a confined passageway formed with a heat exchange surface so that some of the heat liberated by the reaction is absorbed by the heat exchange surface, reducing the velocity of the fluidized mass as it leaves the top of the passageway to separate some of the finely divided solid particles from the fluidized mass, dropping the separated particles over other heat exchange surfaces to cool the particles and returning the separated cooled solid particles to the confined passageway with additional reactant gas.

5. A vessel having an inlet and an outlet, a circle of tubes positioned vertically within said vessel and terminating short of the ends of said vessel to form a vertical central passageway, drums in said vessel associated with said tubes, a larger concentric circle of tubes adjacent the outer wall of said vessel also terminating short of the ends of said vessel and associated with said drums, the tubes in said larger circle having bent portions to space them from the smaller circle of tubes, a conduit with one end positioned in the central passageway and the other end spaced a short distance from the inlet to the vessel thereby forming an annular gap, the said conduit being so arranged that a fluidized mixture of finely divided solids in a gaseous suspension is passed through said passageway in direct contact with said smaller circle of tubes, and means so arranged as to cause some of the finely divided solids to be separated from the fluidized mixture after it leaves said passageway and to cause the separated finely divided solids to descend in the annular passage formed by tubes in said larger circle and walls of the vessel and pass through the aforementioned gap to cause the descending fluidized mixture to unite and be recirculated with the incoming mixture of gas and solids.

6. A vessel having an inlet and an outlet, a circle of heat exchange tubes positioned vertically within said vessel and terminating short of the ends of said vessel to form a vertical central passageway, drums in said vessel communicating with the ends of said tubes, a larger concentric circle of heat exchange tubes adjacent the outer wall of said vessel also terminating short of the ends of said vessel and communicating with said drums, the tubes in said larger circle having bent portions to space them from the smaller circle of tubes, a conduit with one end positioned in the central passageway and the other end spaced a short distance from the inlet to the vessel thereby forming an annular gap, the said conduit being so arranged that a fluidized mixture of finely divided solids in a gaseous medium is introduced into said vessel, passed upwardly through said central passageway in contact with said smaller circle of tubes and means arranged so as to cause at least a portion of the fluidized mixture leaving said passageway to be contacted with the larger circle of heat exchange tubes and said fluidized mixture caused to descend in the annular passage formed by the larger circle of tubes and the vessel walls and passed through the aforementioned gap to cause the descending fluidized mixture to unite and recirculate with the incoming mixture of gas and finely divided solids.

7. A vessel having an inlet and an outlet, a plurality of heat exchange tubes positioned vertically within said vessel and terminating short of the ends of said vessel to form a vertical passageway, another plurality of heat exchange tubes positioned vertically within said vessel also terminating short of the ends of said vessel and spaced from said tubes forming said passageway, a conduit with one end positioned in the vertical passageway and the other end spaced a short distance from the inlet to the vessel thereby forming an annular gap, the said conduit being so arranged that a fluidized mass of solid particles is introduced through said inlet and is passed through said passageway in indirect heat exchange with said tubes forming said passageway and means whereby at least a portion of the fluidized mass leaving said passageway is indirectly contacted with the other heat exchange tubes spaced from the tubes forming said passageway.

8. A vessel adapted for the treatment of gases and solids which comprises an outer closed shell, a plurality of heat exchange tubes positioned in said shell forming an annulus and dividing said shell into an inner vertical passageway and an outer annular passageway, said heat exchange tubes being spaced from the ends of said shell to provide communication between said inner passageway and said outer annular passageway at opposite ends of said shell, an inlet conduit at the lower end of said shell for introducing a gaseous stream therein, a conduit with an end positioned in the inner passageway and the other end spaced a short distance from the inlet to the vessel thereby forming an annular gap, said inlet conduit being positioned to direct said gaseous stream upwardly through said inner passageway, an outlet conduit at the upper end of said shell for withdrawing the gaseous stream therefrom, said shell being adapted to contain a body of finely divided solid material which is circulated in an upward direction through said inner passageway by the gaseous stream rising therethrough and downwardly through said outer annular passageway, and means for maintaining a gas in admixture with said solids in said outer annular passageway in an amount sufficient to maintain said solids in a fluid state therein.

9. In the apparatus defined by claim 8, the further improvement which comprises heat exchange means positioned in said outer annular passageway.

WALTER A. WURTH.

Disclaimer 2,383,636.—*Walter A. Wurth*, Cranford, N. J. TEMPERATURE CONTROL OF CATALYTIC REACTIONS. Patent dated Aug. 28, 1945. Disclaimer filed Aug. 11, 1948, by the assignee, *Standard Oil Development Company*.

Hereby enters this disclaimer of |claim 4.

[*Official Gazette Sept. 7, 1948.*]

the ends of said vessel to form a vertical passageway, another plurality of heat exchange tubes positioned vertically within said vessel also terminating short of the ends of said vessel and spaced from said tubes forming said passageway, a conduit with one end positioned in the vertical passageway and the other end spaced a short distance from the inlet to the vessel thereby forming an annular gap, the said conduit being so arranged that a fluidized mass of solid particles is introduced through said inlet and is passed through said passageway in indirect heat exchange with said tubes forming said passageway and means whereby at least a portion of the fluidized mass leaving said passageway is indirectly contacted with the other heat exchange tubes spaced from the tubes forming said passageway.

8. A vessel adapted for the treatment of gases and solids which comprises an outer closed shell, a plurality of heat exchange tubes positioned in said shell forming an annulus and dividing said shell into an inner vertical passageway and an outer annular passageway, said heat exchange tubes being spaced from the ends of said shell to provide communication between said inner passageway and said outer annular passageway at opposite ends of said shell, an inlet conduit at the lower end of said shell for introducing a gaseous stream therein, a conduit with an end positioned in the inner passageway and the other end spaced a short distance from the inlet to the vessel thereby forming an annular gap, said inlet conduit being positioned to direct said gaseous stream upwardly through said inner passageway, an outlet conduit at the upper end of said shell for withdrawing the gaseous stream therefrom, said shell being adapted to contain a body of finely divided solid material which is circulated in an upward direction through said inner passageway by the gaseous stream rising therethrough and downwardly through said outer annular passageway, and means for maintaining a gas in admixture with said solids in said outer annular passageway in an amount sufficient to maintain said solids in a fluid state therein.

9. In the apparatus defined by claim 8, the further improvement which comprises heat exchange means positioned in said outer annular passageway.

WALTER A. WURTH.

Disclaimer 2,383,636.—*Walter A. Wurth*, Cranford, N. J. TEMPERATURE CONTROL OF CATALYTIC REACTIONS. Patent dated Aug. 28, 1945. Disclaimer filed Aug. 11, 1948, by the assignee, *Standard Oil Development Company*.

Hereby enters this disclaimer of |claim 4.

[*Official Gazette Sept. 7, 1948.*]